United States Patent [19]

Tezuka et al.

[11] Patent Number: 4,787,005
[45] Date of Patent: Nov. 22, 1988

[54] RECORDING AND/OR REPRODUCING APPARATUS HAVING IMPROVED HEAD STABILIZING MEANS

[75] Inventors: Nobuo Tezuka, Kanagawa; Tsukasa Uehara, Tokyo, both of Japan

[73] Assignee: Canon Kabushiki Kaisha, Tokyo, Japan

[21] Appl. No.: 11,381

[22] Filed: Feb. 5, 1987

Related U.S. Application Data

[63] Continuation of Ser. No. 523,727, Aug. 16, 1983, abandoned.

[30] Foreign Application Priority Data

Aug. 18, 1982 [JP] Japan ................. 57-142944

[51] Int. Cl.⁴ ................. G11B 15/60; G11B 23/03
[52] U.S. Cl. ................. 360/130.2; 360/133
[58] Field of Search .......... 360/97, 99, 130.2, 130.3, 360/130.34, 133

[56] References Cited

U.S. PATENT DOCUMENTS

| | | | |
|---|---|---|---|
| 3,684,295 | 8/1972 | Strain et al. | 360/96.5 |
| 3,975,774 | 8/1976 | Helbers | 360/130.34 |
| 4,193,102 | 3/1980 | Beuch et al. | 360/130.34 |
| 4,315,289 | 2/1982 | Holecek et al. | 360/130.34 |
| 4,320,429 | 3/1982 | Knerich et al. | 360/130.34 |
| 4,466,032 | 8/1984 | Saito | 360/130.34 |
| 4,652,949 | 3/1987 | Muraoka | 360/97 |
| 4,656,543 | 4/1987 | Oosaka et al. | 360/130.34 |
| 4,665,453 | 5/1987 | Mikamoto et al. | 360/99 |

Primary Examiner—Robert S. Tupper
Assistant Examiner—Melissa J. Koval
Attorney, Agent, or Firm—Robin, Blecker & Daley

[57] ABSTRACT

A recording and/or reproducing apparatus using a disc shaped flexible recording medium, which includes a recording and/or reproducing head, a receiving part receiving therein the recording medium and movable for causing the recording medium to gain access to the head, a stabilizing member movably supported on a portion of the receiving part and movable relative thereto to gain access to the recording medium and a moving mechanism for moving the stabilizing member so as to gain access to the recording medium in response to the movement when the receiving part is moved to cause the recording medium to gain access to the head.

13 Claims, 4 Drawing Sheets

RECORDING AND/OR REPRODUCING APPARATUS HAVING IMPROVED HEAD STABILIZING MEANS

This is a continuation, of application Ser. No. 523,727, filed Aug. 16, 1983, now abandoned.

BACKGROUND OF THE INVENTION

1. Field of the Invention

This invention relates to a recording and/or reproducing apparatus arranged to perform recording or reproduction with a cassette which houses a recording medium such as a magnetic sheet loaded on a cassette receiving part of the apparatus.

2. Description of the Prior Art

In a recording and/or reproducing apparatus of the kind performing recording or reproduction by rotating a recording medium such as a flexible magnetic sheet, the recording medium is generally placed within a cassette to protect it from being damaged or soiled and also to facilitate handling thereof. Meanwhile, to stabilize contact between the recording medium and a recording and/or reproducing head of the recording and/or reproducing apparatus (including a condition in which they confront each other across an air film) and particularly to stabilize the travel of the recording medium in the vicinity of the head, a stabilizing plate is provided around the head.

Where such a stabilizing plate is provided on an apparatus arranged to perform recording or reproduction by loading it with a cassette containing a recording medium, however, the stabilizing plate must be retracted from the moving locus of the cassette when the cassette is taken out or loaded. The methods heretofore employed for retracting the stabilizing plate include:

(i) A method in which a carrier of double structure of separate sections which carries a cassette in one section thereof and the stabilizing plate in the other is arranged to have the cassette and the stabilizing plate not come into contact with each other when the cassette is taken out or loaded (see FIGS. 2 and 3 of the accompanying drawings.)

(ii) A method in which the stabilizing plate is provided with a rotation shaft which is arranged on the body of the recording and/or reproducing apparatus to be operable in response to the opening and closing movement of a cassette receiving part of the apparatus; and (iii) A method in which electromagnetic means is used for operating the stabilizing plate.

In accordance with these conventional methods, however, the portion of the apparatus around the cassette receiving part and the stabilizing plate has inevitably become large in size and complex in structure.

SUMMARY OF THE INVENTION

This invention is directed to elimination of the above-stated shortcomings of the methods of the prior art. It is, therefore, a general object of the invention to provide a novel recording and/or reproducing apparatus which is capable of eliminating the shortcomings of the prior art methods.

Another object of the invention is to provide a recording and/or reproducing apparatus adapted for recording and/or reproducing on and/or from a recording medium contained in a cassette, wherein the structural arrangement required for having a stabilizing member which is arranged to stabilize the travel of the recording medium retracted from the moving locus of the cassette when the cassette is either taken out or loaded is simplified to permit reduction in size and weight.

To attain the object, an apparatus arranged according to the aspect of the invention as a preferred embodiment thereof comprises a cassette receiving part for receiving a cassette which contains a recording medium; a stabilizing member movably supported on a portion of the cassette receiving part and causing a recording medium contained in the cassette to travel in a stable manner; and moving means for shifting the stabilizing member to a first operative position relative to the cassette receiving part when the cassette receiving part is set in a position for recording or reproducing and to a second inoperative position when the cassette receiving part is set in a position for taking out or loading the cassette.

The above and further objects and features of the invention will become apparent from the following detailed description of embodiments thereof taken in connection with the accompanying drawings.

DETAILED DESCRIPTION OF THE PREFERRED EMBODIMENT

In the following description, a cassette containing a recording medium, a conventional arrangement for stabilizing a recording medium, first and second embodiment examples of the invention will be described in that order.

Figure 1:
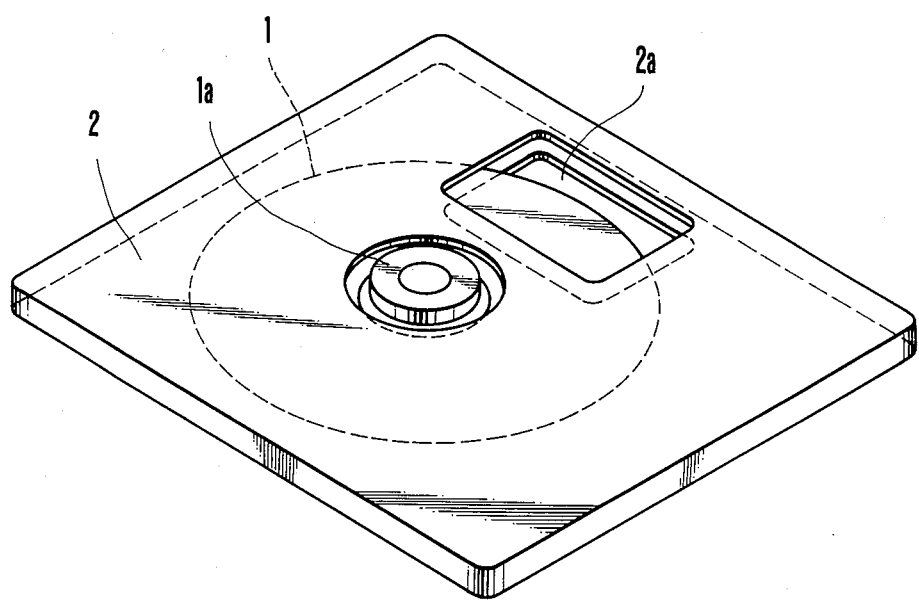
FIG. 1 is an oblique view showing a cassette containing a recording medium.

In FIG. 1, the cassette 2 contains therein a flexible magnetic disc or sheet 1. The cassette is provided with a shaft coupling part which is disposed in the center of the magnetic sheet 1 for coupling with a rotation driving shaft of a shaft rotating motor. The cassette 2 which is arranged to contain therein the magnetic sheet 1 is provided with an opening 2a. The opening 2a permits the magnetic sheet 1 and a recording or reproducing head to make a relative movement in contact with each other. Meanwhile, a stabilizing member which will be described later herein is arranged to be inserted through this opening 2a.

Figure 2:
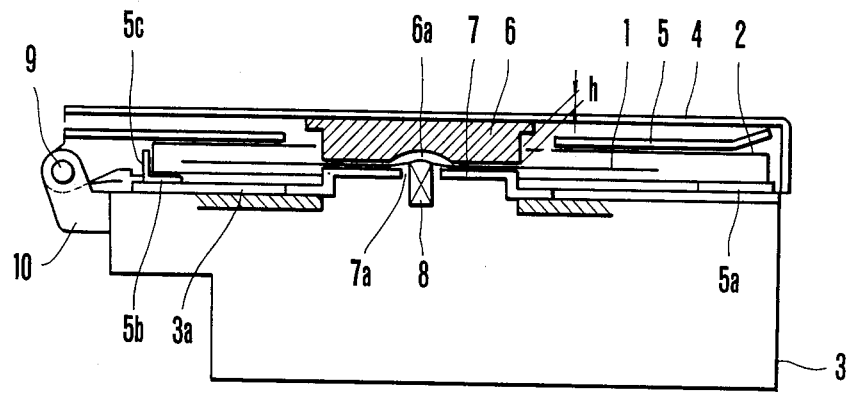
FIG. 2 is a sectional view showing a recording and/or reproducing apparatus provided with a conventional recording medium stabilizing arrangement.
Figure 3:
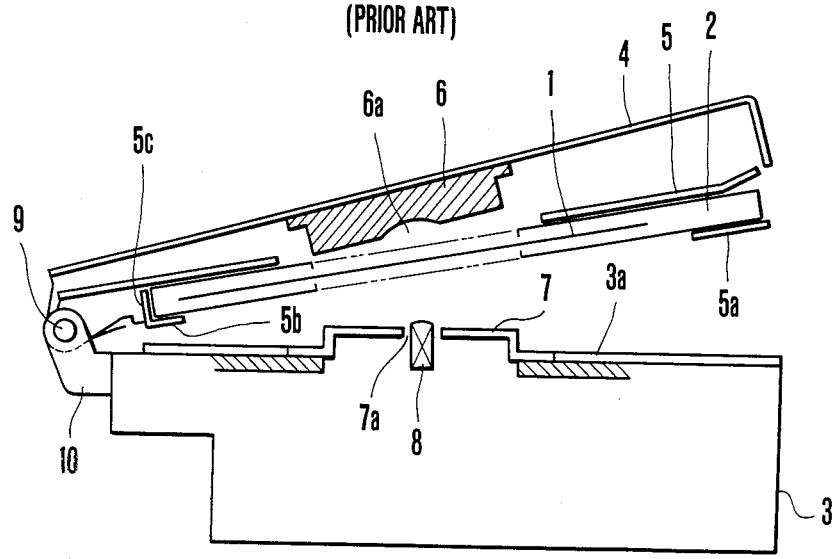
FIG. 3 is a sectional view showing the apparatus of FIG. 2 as in a state of having a cassette receiving part opened for taking out or inserting a cassette.

FIGS. 2 and 3 are sectional views showing a portion around a head of a recording and/or reproducing apparatus which is provided with sheet stabilizing arrangement of the prior art. In the state of the apparatus as shown in FIG. 2, the cassette 2 is duly loaded on the apparatus to have the latter in a recording or reproducing condition. In these drawings, a reference numeral 3 denotes a box body of the apparatus; 3a denotes a cassette loading station of the box body 3; 4 denotes an outer lid; 5 denotes an inner lid which is arranged to carry the cassette 2; and 6 denotes an upper stabilizing member attached to the outer lid 4. Both the outer and inner lids 4 and 5 are pivotally carried by a shaft 9 attached to an arm part 10 which is provided on the box body 3 and are thus arranged to be turnable on the shaft 9. The inner lid 5 is provided with extension parts 5a and 5b which are arranged to support the cassette 2 from below. A rising part 5c is formed continuously from the extension part 5b and is arranged to define the fore end position of the cassette 2 when the apparatus is loaded with the cassette. The apparatus includes a lower stabilizing member 7 and a magnetic recording and/or reproducing head 8. They are arranged in the cassette loading station 3a. The head 8 is movable in the radial direction of the sheet 1, that is, in a direction perpendicular to the paper surface of the drawings of FIGS. 2 and 3 as viewed theren by means which is not shown. The upper stabilizing member 6 and the lower stabilizing member 7 are provided with a recess 6a and an opening 7a, which are arranged along the moving path of the head 8.

The upper and lower stabilizing members 6 and 7 and the head 8 are arranged to be inserted into the cassette 2 via the opening 2a of the cassette 2. With the magnetic sheet 1 partially interposed in between these stabilizing members 6 and 7, the magnetic sheet is caused to rotate without vibration or the like by a sheet rotating motor. Therefore, the sheet 1 stably comes into contact with the head 8 for recording or reproduction. Since the upper stabilizing member 6 should be set back to the inside of the cassette 2 by as much as a distance h as shown in FIG. 2, the member 6 must be retracted from the moving locus of the cassette 2 to an extent at least equal to distance h in taking out or loading the cassette 2.

FIG. 3 shows the recording and/or reproducing apparatus of FIG. 2 as in a state of permitting the cassette to be taken out or inserted. In this instance, the outer and inner lids 4 and 5 are turned on the shaft 9 with the former turned to a greater angle than the latter. Therefore, the upper stabilizing member 6 is retracted by the greater turning angle of the former away from the moving locus of the cassette 2. This arrangement of the prior art necessitates the use of the inner lid 5 which is large in size. Besides, the inner and outer lids 5 and 4 must be driven to turn at different angles as shown in FIG. 3. As a result of that, the structural arrangement of the prior art becomes complex although it is not shown in the drawing. The structural arrangements of other prior art methods described in Para. (ii) and (iii) in the foregoing also inevitably become complex.

Whereas, in accordance with this invention, the structural arrangement for retracting the stabilizing member is simplified to permit reduction in size and weight of the apparatus as a whole. In the first embodiment of the invention, a cassette receiving part is formed at an outer lid through a suitable member. A distance between the stabilizing member and the cassette receiving part is arranged to vary as the cassette receiving part shifts between a position for a recording or reproducing operation and a position for taking out or inserting the cassette with the stabilizing member arranged to be movable relative to the cassette.

Figure 4:
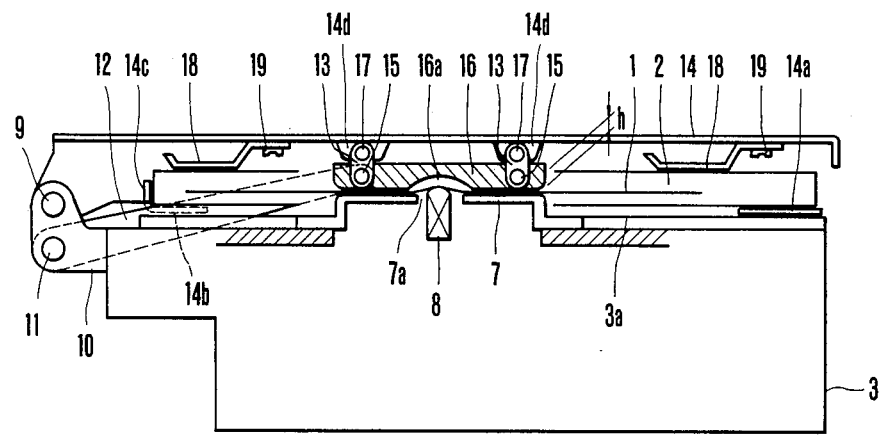
FIG. 4 is a sectional view showing a recording and/or reproducing apparatus constituting a first embodiment of the present invention.
Figure 5:
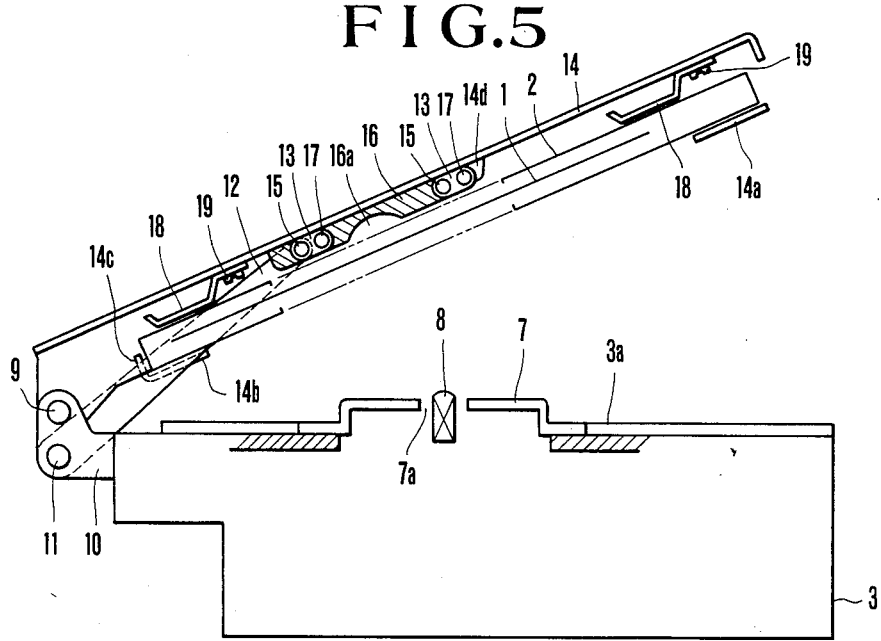
FIG. 5 is a sectional view showing the apparatus of FIG. 4 as in a state of having the cassette receiving part thereof opened for taking out or inserting a cassette.

FIGS. 4 and 5 show the embodiment on a larger scale than FIGS. 2 and 3. The same reference numerals are used in FIGS. 4 and 5 in indicating parts fundamentally the same in arrangement and function as those corresponding parts shown in FIGS. 1-3. Such parts, therefore, do not require further description. The embodiment is provided with an outer lid 14; an upper stabilizing member 16 which is provided with a recess 16a formed along the moving path of the head 8; shafts 15 which are provided for the upper stabilizing member 16; shafts 17 which are provided for the outer lid 14 and are disposed at the parts 14d thereof; and levers 13 which are arranged to connect the shafts 15 to the shafts 17 respectively. The outer lid 14, the levers 13 and the upper stabilizing member 16 jointly form a parallel link mechanism. The embodiment further includes a second shaft 11 which is provided at an arm part 10; a lever 12 which is arranged to connect the shafts 11 and 15 to each other; and extension parts 14a and 14b which extend, for example, from the outer lid 14. The extension parts 14a and 14b are formed by partially bending two ends of the outer lid 14 downward and then inward as viewed from right hand side of FIG. 4. They are thus arranged to support the cassette from below. An uprising part 14c is formed continuously from the extension part 14b and is arranged to define the fore end position of the cassette 2 when the embodiment is loaded with the cassette 2. When loaded, the cassette 2 is pushed from above by cassette pushing springs 18 which are secured to the inner wall of the outer lid 14 by means of screws 19.

With the embodiment arranged as described above, when the outer lid 14 is opened for inserting or taking out the cassette 2 as shown in FIG. 5, the upper stabilizing member 16 is turned clockwise by the lever 12 and the parallel link mechanism (14, 13 and 16) and thus comes nearly in contact with the inner wall of the outer lid 14 away from the moving locus of the cassette 2. When the outer lid 14 is closed for recording or reproduction as shown in FIG. 4, the upper stabilizing member 16 is again inserted into the cassette 2 to an extent as much as distance h. Then, the upper and lower stabilizing members 16 and 7 serve to ensure stable travel of the magnetic sheet in the vicinity of the head 8. In that instance, the cassette 2 is of course located on the cassette loading station 3a with the coupling part 1a of the sheet 1 coupled with the rotation shaft of the motor which is not shown.

Such being the arrangement of the embodiment, the spacing distance between the stabilizing member 16 and the cassette receiving part varies in respons to the opening and closing actions of the outer lid 14. Therefore, the arrangement of the embodiment greatly simplifies the stabilizing member retracting arrangement of the prior art in which a stabilizing member is arranged separately from the cassette receiving part with an additional operation part provided for operating the stabilizing member.

Further, the embodiment is preferably provided with a spring mechanism which is arranged to push the cassette 2 out of the cassette receiving part when the cassette 2 is to be taken out and also with means for locking it at an inserting port at the time of loading the embodiment with the cassette 2. The spring mechanism and the locking means can be arranged in a manner as has been disclosed in a copending U.S. Patent Application (Serial Number not yet given) filed by one of the present applicants.

Figure 6:
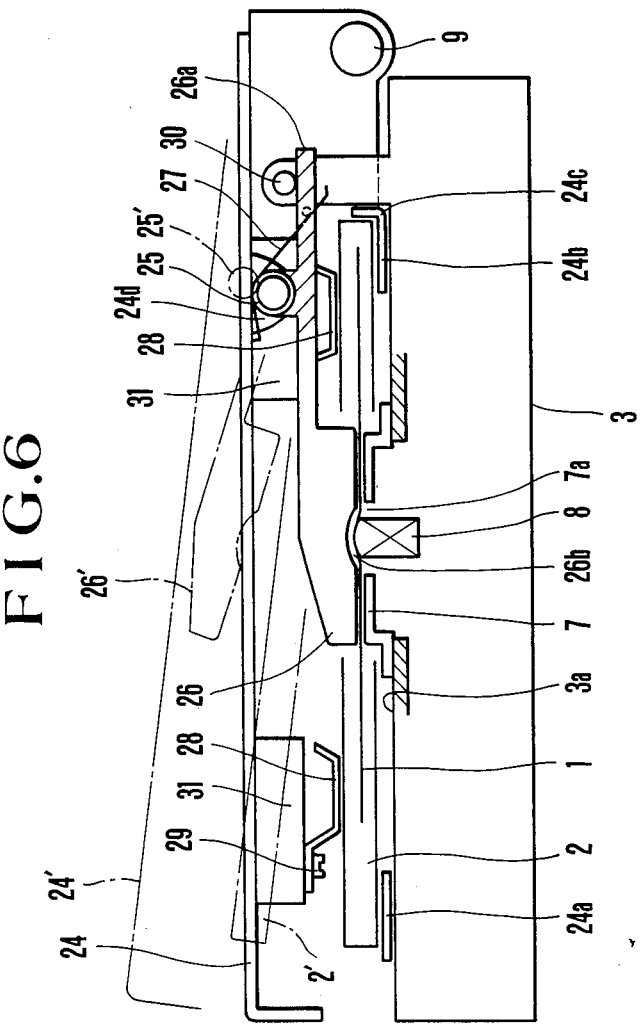
FIG. 6 is a sectional view showing a recording and/or reproducing apparatus constituting a second embodiment of the invention.

A second embodiment of the present invention is arranged as shown in FIG. 6. In this embodiment, the displacement of the stabilizing member relative to the cassette receiving part is arranged such that the relative angle between the stabilizing member and the cassette receiving part changes as the cassette receiving part shifts between a position for recording or reproduction and another position for taking out or loading the cassette. In FIG. 6, reference numerals that are same as those of FIGS. 1-5 denote members arranged and function in the same manner as corresponding ones shown in these drawings. In addition to these same members, the second embodiment includes an outer lid 24; a shaft 25 which is provided at a part 24d of the outer lid 24; and an upper stabilizing member 26 which is pivotally carried by the shaft 25 and is provided with a recess 26b formed along the moving path of the head 8. The embodiment further includes a spring 27 which exerts an urging force on the upper stabilizing member 26 to urge it to turn counterclockwise; a pin 30 which is disposed at a part of the box body 3 of the apparatus and has one end 26a of the upper stabilizing member 26 abutting thereon; and a fixed base attached to the inner wall of the outer lid 24 with a cassette pressing spring 28 secured to the lower face thereof by a screw 29, the spring 28 being arranged to push the cassette 2 from above when the cassette is loaded. The outer lid 24 is provided with extension parts 24a and 24b which are arranged to support the cassette 2 from below in the same manner as the parts 14a and 14b of FIG. 4. An uprising part 24c is formed continuously from the extension part 24b and is arranged to define the fore end position of the cassette 2 when the embodiment is loaded with the cassette. In FIG. 6, the positions of the extension parts 24a and 24b, the uprising part 24c, the pressing spring 28 and the fixed base 31 which obtain at the time of opening the outer lid 24 are omitted from illustration. However, their positions in that instance will be selfevident from their relation to the position 24' of the outer lid and the position 2' of the cassette indicated.

When the outer lid 24 is opened for the purpose of taking out or inserting the cassette 2 as indicated by a two-dot chain line 24', the upper stabilizing member 26 also moves following the outer lid 24. However, since one end 26a of the member 26 is abutting on the pin 30 secured to the box body 3, the upper stabilizing member 26 turns clockwise on the shaft 25 and is retracted from the moving locus of the cassette 2. The outer lid 24 is turned to a certain angle by a turning operation to bring it to a cassette taking out or loading position. However, the abutting of the upper stabilizing member 26 on the pin 30 causes the upper stabilizing member 26 to further turn relative to the outer lid 24, so that the member 26 can be retracted from the cassette moving locus 2'. Further, in FIG. 6, a reference numeral 25' denotes the position of the shaft 25 which obtains when the outer lid 24 turns. When the outer lid 24 is closed for recording or reproduction, the upper stabilizing member 26 is inserted into the cassette to ensure stable travel of the magnetic sheet 1 in conjunction with the lower stabilizing member 7 in the same manner as in the case of the first embodiment example.

The second embodiment also permits simplification of structural arrangement required for retracting the stabilizing member 26 in the same manner as in the first embodiment. In the second embodiment, the matters other than the points described in the foregoing are similar to those arranged in the first embodiment.

In accordance with the invention, as has been described in the form of embodiment examples in the foregoing, the stabilizing memmber for stabilizing the travel of the recording medium is disposed within the cassette receiving part; and the position of the stabilizing member is arranged to be shiftable relative to the cassette receiving member to a first position when the cassette receiving part is set in a position for recording or reproduction and to a second position when the cassette receiving part is set in a position for taking out or loading the cassette. The arrangement according to the invention permits great simplification of the mechanism required for retracting the stabilizing member when the cassette is taken out or loaded on the apparatus.

The invention is of course not limited to the specific structural arrangement of the embodiment examples given in the foregoing. Many modifications and variations may be made to the embodiment examples without departing from the spirit or scope of the following claims. For example, the arrangement to turn the outer lid 14 or 24 in the embodiment examples shown in FIGS. 4-6 may be replaced with arrangement to slide the outer lid.

The positional adjustment of the recording and/or reproducing head 8 at the working position of the stabilizing member 16, 26 can be easily performed in the first embodiment as shown in FIGS. 4 and 5, for example, by appropriately rotating the second shaft 11 serving as an eccentric axis and in the second embodiment shown in FIGS. 6, by appropriately rotating at least one of the shaft 25 and the pin 30, both or either serving as an eccentric member as shown. In the latter case, in particular, when both the shaft 25 and the pin 30 are used for the adjustment, a satisfactory positional adjustment is achieved with elimination of the possible inclination to the magnetic sheet 1 of the surface of the stabilizing member 26 opposing thereto, which would be caused when only one of the shaft and the pin is used for the adjustment.

While specific embodiments of the invention have been shown and described in detail to illustrate the application of the inventive principles, it will be understood that the invention may be embodied otherwise without departing from such principles.

What we claim:

1. A recording and/or reproducing apparatus using a disc shaped flexible recording medium, comprising:
    (A) head means for recording signals on said recording medium and/or reproducing recorded signals from the recording medium;
    (B) a lid for covering said head means and having a holding member for holding therein said recording medium, said lid being movable supported in said apparatus and thereby closable for causing the recording medium to gain access to said head means and openable for receiving said recording medium;
    (C) stabilizing means for stabilizing a portion of said medium, said stabilizing means being supported at a portion of said lid in such a manner as to be movable between an active position at which it can gain access to the recording medium held at said holding member and a non-active position being separated from said recording medium; and
    (D) control means for controlling the movement of said stabilizing menas between said active and non-active positions thereof in correspondence with the opening and closing of said lid, said control means being connected to said said stabilizing means and said main body and operating so as to move the stabilizing means in a first direction with respect to the lid for bringing said stabilizing means into said active position when the lid is closed and operating so as to move the stabilizing means in a second direction with respect to the lid when the lid is opened.

2. The apparatus according to claim 1, further comprising;
a main body comprising said head means;
said lid being connected to a portion of said main body and movably supported thereby.

3. The apparatus according to claim 2, wherein said lid is pivotable relative to said main body.

4. The apparatus according to claim 2, wherein said control means includes link means for connection of said stabilizing means to said lid.

5. The apparatus according to claim 4, wherein said control means includes lever means for connection of said stabilizing means to said main body.

6. The apparatus according to claim 2, wherein said stabilizing means is pivotable relative to said lid.

7. A recording and/or reproducing apparatus using a disc shaped flexible recording medium, comprising:
(A) a main body having a station for signal recording and/or reproducing on or from said recording medium;
(B) a lid for covering said station and having a holding member for holding therein said recording medium, said lid being movable supported by said main body and thereby closable to cause the recording medium to gain access to said signal recording and/or reproducing station and openable for receiving said recording medium;
(C) stabilizing means for stabilizing said recording medium at least when said lid is closed;
(D) support means for movably supporting said stabilizing means on a portion of said lid in such a manner as to be movable between an active position at which it can gain access to said signal recording and/or reproducing station and a non-active position separated from said recording medium; and
(E) control means provided between said support means and said main body for moving said stabilizing means toward the lid in the course of opening of said lid, said stabilizing means thereby being in said non-active position thereof, and for moving said stabilizing means away from said lid in the course of closing of said lid, said stabilizing means thereby being in said active position thereof.

8. A recording and/or reproducing apparatus using a cassette which houses therein a recording medium, said cassette having opposed surfaces with respective aligned openings, said apparatus comprising:
(A) a main body part having a station for having said cassette loaded thereon;
(B) a lid for covering said station and having a cassette holding member fixed to it for holding said cassette, said lid being movable relative to said main body part between a first position at which the lid uncovers said station of the main body part and a second position at which the lid covers said station;
(C) a recording and/or reproducing head disposed at said station in such a manner than said head gains access to said recording medium housed in said cassette through one of said openings of the cassette when said lid is at said second position;
(D) a stabilizing member which has a predetermined surface for stabilizing a portion of said recording medium which passes said head, said stabilizing member gaining access to said recording medium through one of said openings of said cassette and being attached to said lid for movement relative to said lid so that it can move between an active position to gain access to the recording medium within the cassette held by the holding member and a non-active position separated from said recording medium; and
(E) control means connected to said stabilizing means and to said main body for stabilizing member relative to said lid and operating so as to move said stabilizing member to said non-active position upon movement of said lid from said second position to said first position and to move said stabilizing member to the active position upon movement of said lid from said first position to said second position.

9. A recording and/or reproducing apparatus according to claim 8, wherein said control means operates to displace said stabilizing member from the other opening of said cassette when the said lid is in at the first position, and places said stabilizing member in said opening of the cassette when said lid is in the second position.

10. The apparatus according to claim 9, wherein said stabilizing member is connected to said lid through a pair of link members.

11. The apparatus according to claim 10, wherein said controlling means includes a third link member connected to said stabilizing member and said main body part and to said main body part at its another end.

12. The apparatus according to claim 9, wherein said stabilizing member is pivotal relative to said lid about a pivot provided on a portion of the lid.

13. A recording and/or reproducing apparatus having improved stabilizing means, comprising:
(A) head means for recording signals on a recording medium and/or reproducing recorded signals from the recording medium, said head means being supported on a main body of the apparatus;
(B) lid means for covering said head means at least during said recording and/or reproducing, said lid means selectively covering said head and having a holding member for holding said recording medium;
(C) stabilizing means provided on said lid means in a movable manner and arranged for selectively applying force to said recording medium held at said holding member from an opposing side of said head by being moved relative to said cover means; and
(D) a control member connected to said stabilizing means and to said main body and operating to control the movement of said stabilizing means relative to the lid means and moving the stabilizing means away from said lid means so that it can effect such force application to the recording medium held at said holding member in correspondence to the selective covering action of said lid.

* * * * *